United States Patent [19]

Mackal

[11] Patent Number: 5,099,546

[45] Date of Patent: Mar. 31, 1992

[54] LANYARD-GRIPPING HANDLE

[76] Inventor: Glenn H. Mackal, 4923 59th Ave. S., St. Petersburg, Fla. 33715

[21] Appl. No.: 523,105

[22] Filed: May 14, 1990

[51] Int. Cl.$^5$ ............ A47B 95/02; A47J 45/00; B65D 25/28

[52] U.S. Cl. .................. 16/110 R; 16/122; 403/269

[58] Field of Search ............ 16/110 R, 122, DIG. 19, 16/DIG. 24; 425/517, 520, 521; 294/153; 254/134.3 R; 403/269

[56] References Cited

U.S. PATENT DOCUMENTS

| | | | |
|---|---|---|---|
| 1,535,546 | 4/1925 | Regar | 425/521 |
| 3,989,580 | 11/1976 | Hoback et al. | 425/517 |
| 4,002,822 | 1/1977 | Kurosaki | 16/2 |

Primary Examiner—Robert L. Spruill
Assistant Examiner—Carmine Cuda
Attorney, Agent, or Firm—Joseph C. Mason, Jr.; Ronald E. Smith

[57] ABSTRACT

A method and apparatus for securing a lanyard to a handle of the type used with inflators. The lanyard is captured in sandwiched relation between the opposite halves of the handle at the time the handle is molded. A pair of confronting lanyard-receiving members are positioned along the longitudinal axis of symmetry of the handle, and the lanyard is placed between them. Plugs that force the lanyard to follow a serpentine path of travel are positioned along the length of each lanyard-receiving member when the molding process begins and the plugs are removed when the handle is completed.

3 Claims, 1 Drawing Sheet

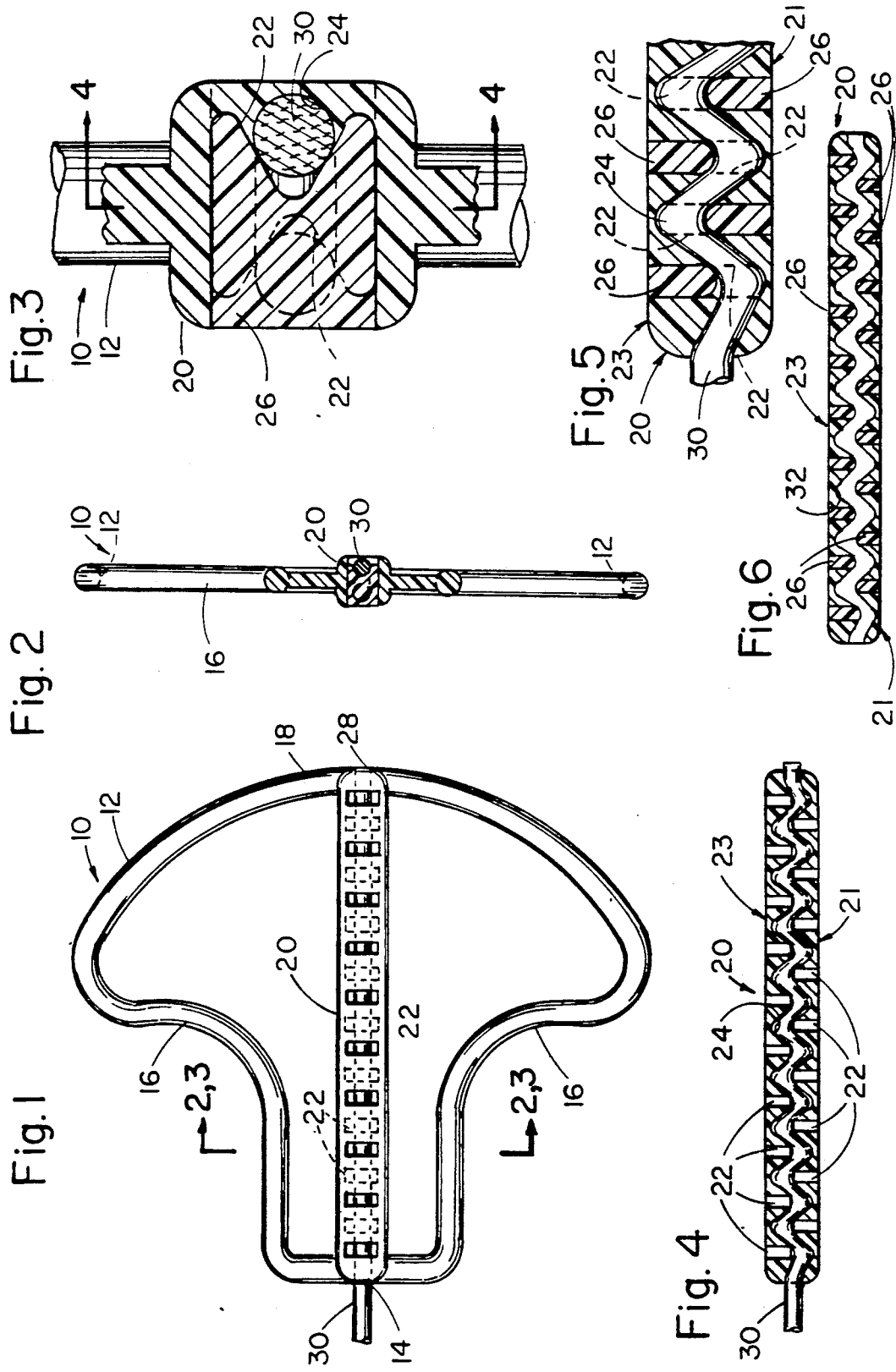

LANYARD-GRIPPING HANDLE

TECHNICAL FIELD

This invention relates, generally, to inflators of the type used to rapidly inflate life vests and other inflatable articles. More particularly, it relates to an improved means for securing together the inflator handle and the lanyard that is pulled to activate the inflator.

BACKGROUND ART

Inflatable devices typically have inflation manifolds that project outwardly from an exterior surface thereof. The manifold is engageable by an inflator member that is in screw threaded engagement with a compressed gas cartridge such as a $CO_2$ cartridge. The inflator includes a lever arm that, when pivoted, drives a cartridge-piercing pin into the cartridge to perform the function its name implies. Gas escaping from the cartridge enters the inflation manifold and thus inflates the device.

An elongate, flexible lanyard extends between the lever arm of the inflator and a handle so that when the handle is pulled, the lever arm is constrained to pivot about a pivot shaft, thereby driving the cartridge-piercing pin into the cartridge.

Thus, the lanyard can separate from the handle when the handle is pulled sharply, as is usually the case in emergency situations.

A current method of securing the handle to the lanyard involves molding the handle into sandwiching relation to the lanyard. Typically, the mold is constructed so that the opposite halves of the handle have protuberances formed therein that pinch the lanyard at several places along its extent. The pinching does defeat facile separation of the lanyard and handle, but does not defeat separation when the handle is pulled hard.

In another known method, an aperture is formed in the handle and the lanyard is threaded therethrough and is either tied or otherwise secured as by crimping.

Accordingly, there is a clear need for an improved apparatus and method of interconnecting handles and lanyards that insures against lanyard and handle separation, but the prior art, taken as a whole, neither teaches nor suggests how the lanyard and handle interconnection heretofore known could be improved.

DISCLOSURE OF INVENTION

A handle-making two part mold includes a pair of confronting, linear-in-configuration lanyard-receiving members, each of which includes a plurality of preferably equidistantly spaced apart removable plug members disposed therein along its extent. The plugs of the first lanyard-receiving member are staggered with respect to the plugs of the second lanyard-receiving member so that when a lanyard is disposed in sandwiched relation between said first and second parts, it is constrained to follow a serpentine path of travel between said plugs. Each plug is generally "V"-shaped to confine the lanyard to the valley thereby created to thus maintain the lanyard in a straight albeit serpentine path of travel. The plugs are removed after the handle molding process is completed.

The lanyard-receiving members are formed integrally with their respective half portions of the handle, and are positioned in coincidence with the longitudinal axis of symmetry of the handle.

The primary object of this invention is to advance the art of inflator manufacture by disclosing a mold apparatus and a method carried out by said apparatus that produces a substantially non-separable lanyard and handle construction.

Additional objects and advantages of the invention will become apparent as this description proceeds.

The invention accordingly comprises the features of construction, combination of elements and arrangement of parts that will be exemplified in the construction set forth hereinafter and the scope of the invention will be indicated in the claims.

DESCRIPTION OF THE DRAWINGS

For a fuller understanding of the nature and objects of the invention, reference should be made to the following detailed description, taken in connection with the accompanying drawings, in which:

FIG. 1 a top plan view of a lanyard handle formed by a mold in accordance with the teachings of this invention;

FIG. 2 is a sectional view taken along line 2—2 in FIG. 1;

FIG. 3 is an enlarged sectional view taken along line 3—3 in FIG. 1;

FIG. 4 is a sectional view taken along line 4—4 in FIG. 3;

FIG. 5 is an enlarged sectional view similar to FIG. 4, but showing plugs occupying the slots shown in FIG. 4; and FIG. 6 is a sectional view similar to FIG. 4, but showing how the handle appears when no lanyard is secured therewithin.

BEST MODES FOR CARRYING OUT THE INVENTION

The novel lanyard handle is denoted as a whole by the reference numeral 10 in FIG. 1. Handle 10 includes an appropriately designed body having a bead 12 and having a leading end 14, finger notches 16 and an arcuate trailing end 18.

A lanyard-receiving member 20 is coincident with the longitudinal axis of symmetry of handle 10 as shown in FIGS. 1 and 2. It accommodates lanyard 30 and thus has a predetermined thickness greater than the thickness of the balance of handle 10 as best understood in connection with FIGS. 1, 2, and 3.

It should be understood from the outset that handle 10 is made in a mold and that all of the FIGS. except FIG. 6 depict the handle after the opposing first and second halves of the mold have been brought together with the lanyard sandwiched therebetween and after the plastic injected into the mold has been introduced. Moreover, it should be understood that lanyard 30 is disposed in overlying relation to bottom or first lanyard-receiving part 21 at the commencement of the molding procedure and that said lanyard is sandwiched between said bottom part of lanyard-receiving member 20 when the upper or second part 23 thereof is brought into juxtaposition with said lower part 21.

It is also important to note in FIG. 1 that lanyard-receiving member 20 is disposed in coincidence with the longitudinal axis of symmetry of handle 10.

A plurality of equidistantly and longitudinally spaced blind slots 22 are formed along the extent of each half of lanyard-receiving member 20; accordingly, when the bottom half 21 and the top half 23 of member 20 are brought together, as perhaps best understood in connection with FIGS. 4 and 5, lanyard 30 is constrained to follow a serpentine path of travel therebetween, as denoted by the reference numeral 24 in said FIGS.

FIG. 6 depicts what handle 10 would look like in longitudinal section if there were no lanyard 30 embedded therein. Serpentine hollow chamber 32 extends from leading end 14 to trailing end 18 of handle 10 in coincidence with the longitudinal axis of symmetry of said handle and is occupied by the lanyard when the plastic is injected into the mold Thus, the injected plastic, upon curing, tightly forms around the lanyard; this, coupled with the serpentine path of travel that the lanyard is constrained to follow, ensures against facile retraction of the lanyard if an external force is imparted against it.

Each slot 22 is initially occupied at least in part by a plug 26 as shown in FIG. 5, when mold parts 21, 23 are initially brought together. The final product is shown in FIG. 4; in that FIG., plugs 26 have been removed and blind slots 22 remain.

The slots need not be blind, i.e., they could extend completely through handle 10.

The process is completed by cutting off lanyard that may project beyond trailing edge 18 of the handle 10 as at 28; a hot knife is employed to inhibit unraveling.

As should be clear from FIG. 4, the large number of bends in lanyard 30 and the close proximity of the longitudinally spaced confronting blind slots 22 insures that separation of lanyard and handle is virtually impossible.

FIGS. 2 and 3 reveal that each plug 26 is generally "V"-shaped to produce complementally formed blind slots 22. As best shown in the enlarged view (FIG. 3), lanyard 30 is guided into the center of each blind slot 22 by the converging side walls of each "V"-shaped valley. Thus, it should be understood that the serpentine path of travel of lanyard 30 is preferably disposed in a common plane. That common plane is the plane of the paper in FIGS. 2-5 and is orthogonal to the plane of the paper in FIG. 1. However, the apex of each "V"-shaped plug could be laterally staggered with respect to contiguous plugs, thereby constraining the lanyard to have lateral bends in its path of travel as well.

It is important to note in FIG. 2 that the opposite halves 21, 23 of lanyard-receiving member 20 are formed integrally with their respective halves of handle 10.

This invention is clearly new and useful. Moreover, it was not obvious to those of ordinary skill in this art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. A handle having a serpentine-in-configuration hollow chamber that extends from a leading end of the handle to a trailing end thereof, said handle having a longitudinal axis of symmetry and said hollow chamber being coincident with said axis of symmetry, a lanyard being tightly received within said hollow chamber and said configuration of said hollow chamber ensuring against facile retraction of said lanyard when an external force is imparted against the lanyard.

2. The handle of claim 1, further comprising a lanyard-receiving member disposed along said longitudinal axis of symmetry, said lanyard-receiving member having a predetermined thickness that is greater than a predetermined thickness of a balance of said handle so that said lanyard is accommodated by said lanyard-receiving member and so that material is saved.

3. A device for securely gripping a preselected end of a lanyard, comprising:

a handle having a top part and a bottom part;

said handle having a longitudinal axis of symmetry;

a lanyard-receiving member having a top part and a bottom part, said lanyard-receiving top part being integral with said handle top part and said lanyard-receiving bottom part being integral with said handle bottom part;

said lanyard-receiving member being disposed coincident with said longitudinal axis of symmetry;

a lanyard disposed in sandwiched relation between said top and bottom parts of said lanyard-receiving member;

said lanyard-receiving member having a predetermined thickness greater than a predetermined thickness of a balance of said handle;

a serpentine hollow chamber formed in said lanyard-receiving member, said hollow chamber being occupied by said lanyard;

whereby facile retraction of said lanyard is defeated by the serpentine configuration of the lanyard within said handle.

* * * * *